March 17, 1931     E. J. SHAUT     1,796,411
LIME SLACKING MACHINE
Filed Aug. 12, 1929     2 Sheets-Sheet 1
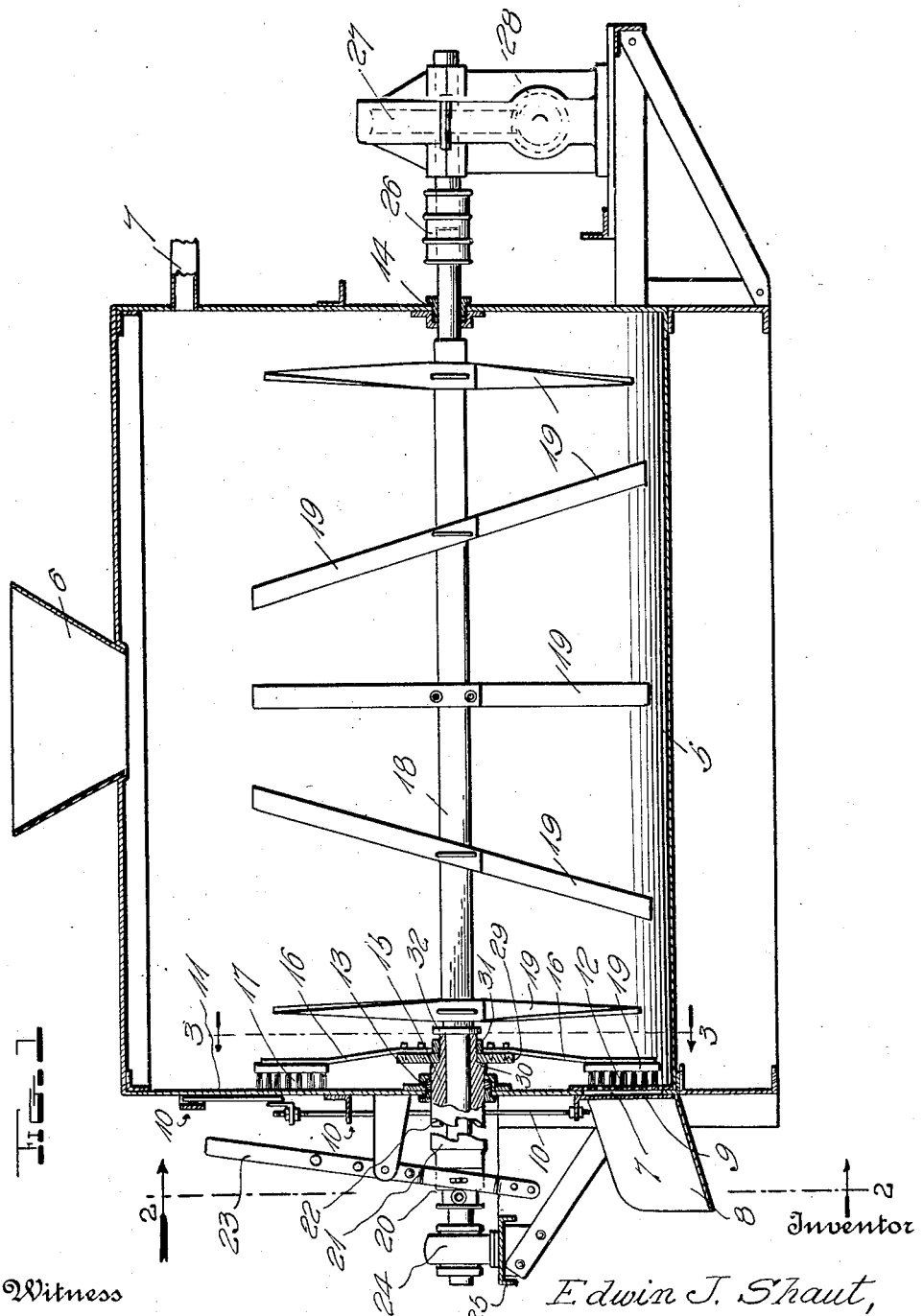
Inventor
Edwin J. Shaut,
Witness

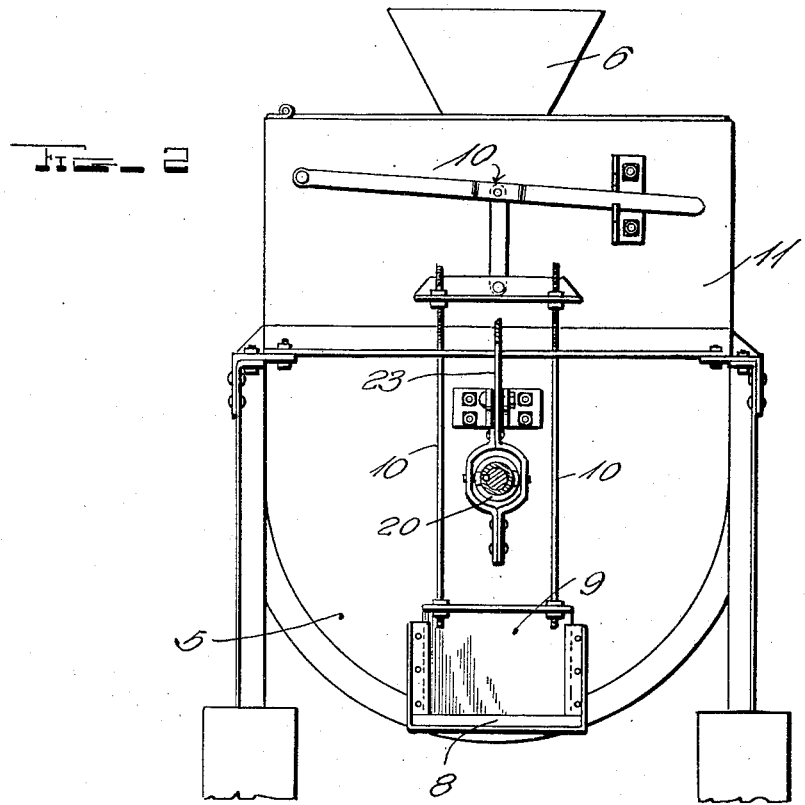
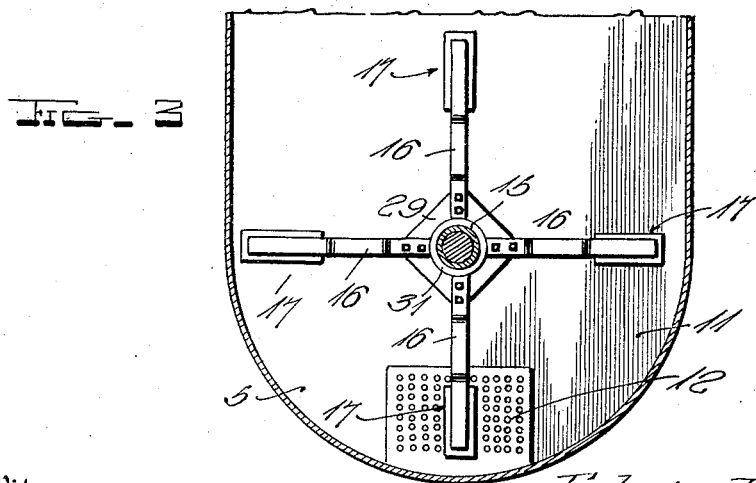

Patented Mar. 17, 1931

1,796,411

UNITED STATES PATENT OFFICE

EDWIN J. SHAUT, OF TUJUNGA, CALIFORNIA, ASSIGNOR TO BAKER LIME MACHINERY CO. LTD., A CORPORATION OF NEVADA

LIME-SLACKING MACHINE

Application filed August 12, 1929. Serial No. 385,144.

The invention relates primarily to a lime slacking machine of a type in which a tank for the lime and water contains an agitator and is provided with a screened outlet for the slacked lime, and it is the principal object of said invention to provide a novel means for cleaning the screen of all unslacked particles of lime and working the lime through said screen while discharge is taking place.

A further object is to provide a novel structure in which the agitator may be driven independently of the screen cleaning means until it is desired to discharge the slacked lime, and whereby said cleaning means may then be driven simultaneously with the agitating means.

With the foregoing in view, the invention resides in the novel subject matter hereinafter described and claimed, description being accomplished by reference to the accompanying drawings.

Fig. 1 is a vertical longitudinal sectional view through a lime slacking machine constructed in accordance with my invention.

Figs. 2 and 3 are vertical transverse sectional views on lines 2—2 and 3—3 respectively of Fig. 1.

In the drawings above briefly described, the numeral 5 denotes a horizontally elongated tank to receive lime through a hopper 6 and water through a pipe 7. One end of this tank is provided with an outlet opening 8 for the slacked lime and with a chute projecting outwardly from said opening, the latter being controllable by a gate 9 and appropriate operating means 10 for said gate. Extending over the opening 8 and secured to one end wall 11 of the tank 5 is a screen 12 through which the slacked lime must discharge. This end wall 11 is provided above the screen 12, with an opening equipped with a stuffing box 13, a similar opening provided with a stuffing box 14, being provided at the opposite end wall of the tank. A sleeve-like brush hub 15 passes rotatably through the stuffing box 13 and engages the packing means of the latter, the inner end of said hub being provided with a plurality of radially disposed spring arms 16 whose outer ends carry brush members 17, said members being adapted to sweep across the screen 12 when the brush 15—16—17 is driven, thereby preventing the discharge of any unslacked lime through the screen 12 with that which has been properly slacked. Normally however, during the slacking operation, the brush is not being driven, as will be hereinafter more fully explained.

A shaft 18 extends longitudinally across the interior of the tank 5, one end of said shaft passing through the stuffing box 14 while the other end thereof passes through the hub 15 in such a manner that it may rotate within said hub during the slacking operation. This shaft 18 is provided at suitable intervals with any desired agitators 19 which facilitate the mixture of lime and water to slack the former, and mounted upon said shaft at the outer side of the end wall 11, is a slidable clutch member 20 which is so connected with said shaft as to be constantly driven thereby. This clutch member is disposed at the outer end of the hub 15 and said clutch member and hub are provided with co-acting clutch teeth 21—22. A lever or the like 23 is provided for shifting the clutch member 20 into and out of engagement with the hub 15 so that the brush 15—16—17 may be driven or allowed to remain stationary, as may be desired.

The end of the shaft 18 adjacent the clutch member 20, is rotatably mounted in a suitable bearing 24 secured upon an appropriate support 25. The other end of the shaft is coupled at 26 with appropriate driving means, said driving means preferably consisting of a worm gear 27 and a motor-driven worm 28 meshing therewith.

In operating the machine, the required quantities of lime and water are deposited in the tank 5 and with the clutch member 20 shifted outwardly from engagement with the hub 15, the shaft 18 is driven, causing the agitators 19 to thoroughly mix the lime and water and cause slacking of the former, the gate 9 being closed during this operation. To discharge the slacked lime, the gate 9 is opened and either before or after opening said gate, the clutch member 20 is shifted into engagement with the hub 15, thereby driving the brush 15—16—17 and causing the brush members 17 to successively sweep across the screen 12. Consequently, these brush members keep the screen 12 clean of unslacked particles of lime and permit nothing to escape except the slacked lime. The brush members 17 are constantly urged toward the end wall 11 and screen 12 for effective contact with the latter, due to the inherent resiliency of the spring arms 16 by which they are carried, and these brush members so work the lime through the screen as to impart substantially uniform consistency to said lime.

The inner ends of the arms 16 are by preference secured to a disk 29 clamped against a shoulder 30 on the hub 15, by a nut 31, but said arms might be mounted in other suitable ways upon the hub 15. The inner end of this hub abuts an appropriate thrust collar 32 on the shaft 18 and hence the tendency of the spring arms 11 to inwardly slide the hub, is effectively resisted.

On account of the excellent results obtainable from the details disclosed, they are preferably followed. However, within the scope of the invention as claimed, variations may be made.

I claim:—

1. A machine of the class described comprising a tank having an outlet and a screen across said outlet, a brush mounted in the tank for movement across said screen to clean the same, an agitator in said tank, and means for operating said agitator without operating said brush or for operating the two simultaneously.

2. A machine of the class described comprising a tank having an outlet and a screen across said outlet, a shaft having an agitator in said tank, a brush adapted for movement across said screen to clean the same, said brush being mounted co-axially with said shaft, and means for operatively connecting said brush and shaft or for disconnecting them.

3. A machine of the class described comprising a tank having an outlet and a screen across said outlet, a shaft having an agitator in said tank, a brush having a hub through which said shaft passes rotatably, said brush being positioned for movement across said screen to clean the same, and a clutch for connecting said hub and shaft at will to drive said brush.

4. A machine of the class described comprising a tank having an outlet and a cylindrical opening in one end, and a screen across said outlet, a brush in the tank disposed for movement across said screen to clean the same, said brush having a hub passing rotatably through said opening, a shaft having an agitator in said tank, one end of said shaft passing rotatably through said hub, and a clutch member on said shaft at the exterior of the tank, said clutch member being co-operable with the outer end of the hub for connecting said hub and said shaft at will to drive said brush.

In testimony whereof I have hereunto affixed my signature.

EDWIN J. SHAUT.